Patented Dec. 23, 1952

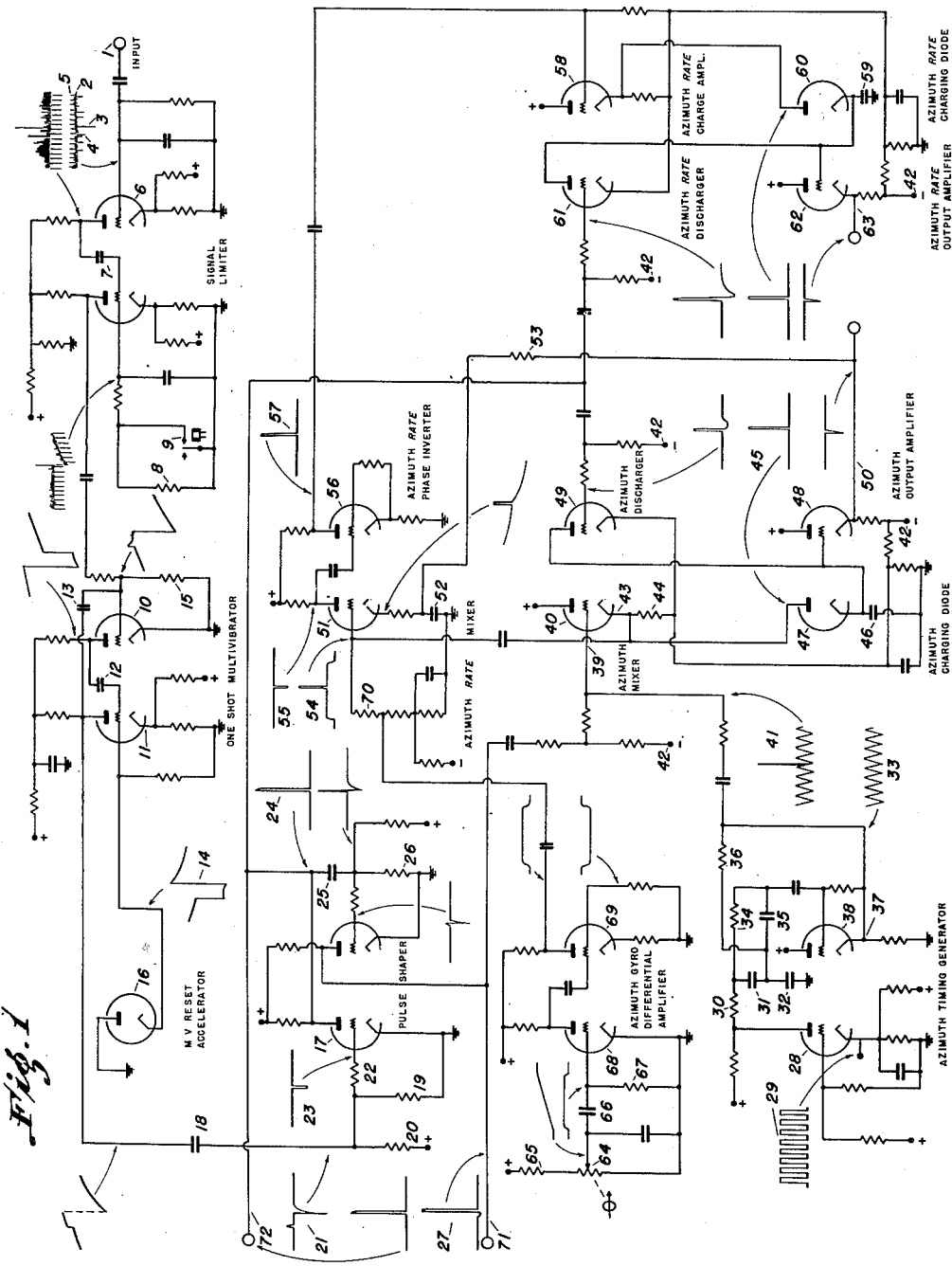

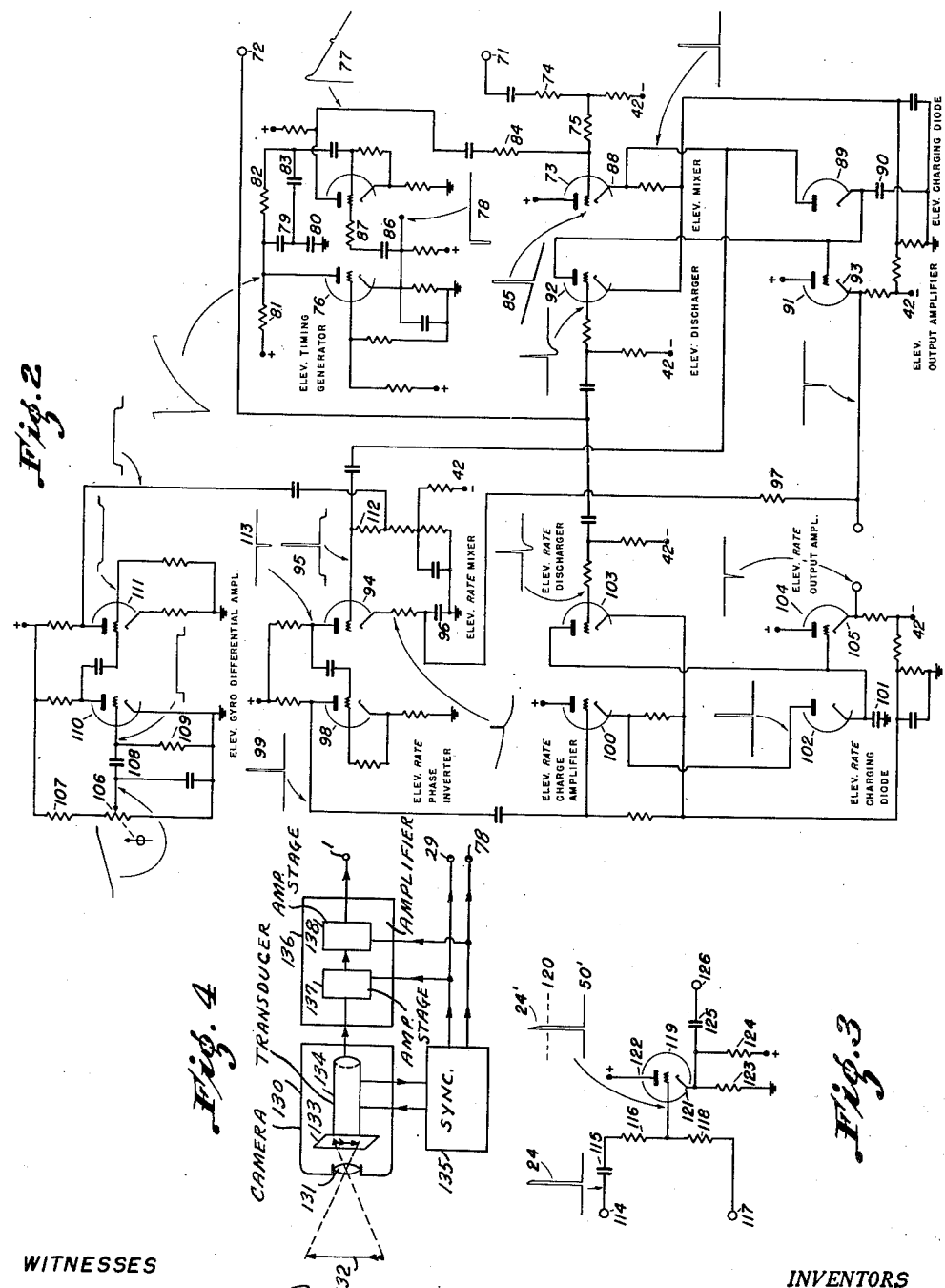

2,623,173

UNITED STATES PATENT OFFICE 2,623,173

TELEVISION PHASE-ACTUATED CONTROL EQUIPMENT

Harry R. Lubcke and Joseph P. Dean, Hollywood, Calif., assignors to General Teleradio, Inc., Los Angeles, Calif., a corporation of California Application June 5, 1947, Serial No. 752,634

14 Claims. (Cl. 250—27)

This invention relates to electrical apparatus for supplying electrical energy for the control of other apparatus according to prescribed functional routines from electrically represented information which is supplied to the subject apparatus from still other apparatus.

An object of this invention is to provide a method for applying video and synchronizing information from television equipment to the control of a vehicle.

Another object of this invention is to provide apparatus which will operate according to one functional routine for a period of time and then according to another routine upon receiving an electrical impulse.

Still another object of this invention is to provide apparatus capable of supplying plural kinds of outputs from a single kind of input.

Still another object of this invention is to provide a method and apparatus which will give correct spatial information concerning a given object in a field of view regardless of the intensity of the index representing the object.

Still another object of this invention is to provide a method and apparatus capable of supplying substantially a "direct current" output from information energy supplied in the form of narrow pulses without incurring a long time-constant delay as would be incurred with the use of a low pass filter of sufficient attenuation to integrate pulse energy to its substantially "direct current" equivalent.

Still another object of this invention is to provide a method and apparatus capable of readjusting an otherwise constant electrical output level in only slightly longer time than is required to impress the new information upon the apparatus.

Still another object of this invention is to provide a method and apparatus which supplies an output proportional to the rate of change (the derivative) of the information supplied to it.

A final object of this invention is to provide apparatus for the combination of plural rates of change into a single output.

The ways in which these objects are attained are illustrated in the accompanying drawings, in which:

Fig. 1 shows the schematic diagram of the azimuth circuit of the equipment.

Fig. 2 shows the schematic diagram of the elevation circuit of the equipment.

Fig. 3 shows an optional circuit adapted to enhance the purity of the output.

Fig. 4 shows apparatus for originating electrically represented information for processing by the equipment of the prior figures.

Vacuum tube heaters and power supplies are not shown but are in accordance with the art and the custom of presenting schematic diagrams.

This apparatus can be classed as "electronic brain" equipment. An embodiment is here described in which television information is supplied to the subject equipment and multiple functions secured suitable for controlling an airborne vehicle. For instance, the subject embodiment initially delivers control information based upon the strongest image signal present in the field of view. If one object ceases to be the strongest signal, control shifts to the stronger newcomer. However, upon receiving an electrical impulse from external means, the mode of functioning of the subject embodiment changes and control information continues to be given upon the signal in control at the instant of the arrival of the stated electrical impulse. Practical tests on the embodiment have shown that this latter desirable function is realized in the face of a new signal of as great as twenty times the controlling signal.

In Fig. 1 is shown the schematic diagram of the embodiment capable of providing both displacement and rate of displacement outputs in both azimuth and elevation as well as to determine rate of displacement from displacement information from auxiliary apparatus, such as a gyro compass, and to combine this rate information into a single output. One important use of these data is to direct a vehicle on a collision course toward an object from which the information is obtained.

It will be understood by those skilled in the art that this embodiment does not demark the limits of the application of the methods and means set forth in this specification.

Referring now to Fig. 1, terminal 1 receives the television-like information. This, basically, consists of a signal pulse, demarking in time in relation to a scanning process the position of an object in a field of view and by the amplitude of the pulse the strength of the signal. The amplitude may be the result of an inherently strong signal as characteristic of the object, or the result of the object being relatively close. In general application, the timing can be alternately employed as an index to the time of occurrence of an event, the accomplishment of a prearranged process, or in connection with another similar operation. The amplitude can likewise represent the value, the deviation from a mean value, the proximity of otherwise equi-signal sources to the equipment or the length of a time interval. Thus, almost any two functions of time or amplitude can be processed by this equipment; it is merely necessary to fit the information to the proper index.

A typical waveform 2 of suitable characteristics is shown adjacent to input terminal 1 in Fig. 1, in which 3 and 4 are signal pulses and 5 is a series of blanking impulses, equally spaced in time. This is the information supplied to this portion of the apparatus when it coacts with the apparatus of Fig. 4. Positive polarity is shown above the axis, negative polarity below.

In Fig. 4, diagrammatically there is shown apparatus for producing the electrically represented information. Device 130 is a television-like camera comprised of an objective lens 131, transparent to the wavelength of the radiation incident thereupon from the field of view, illustrated here as object 132. An image of the object is formed by the lens on the sensitive area 133, or the equivalent.

Transducing means 134 causes the incident energy to be proportionally represented in terms of electrical energy, and in coaction with synchronizing instrumentality 135 in a television-like signal 3, 4 of waveform 2, Fig. 1. The synchronizing and transducing elements are interconnected, either mechanically or electrically. Scanning of the field of view in two dimensions is accomplished.

This scanning bears a fixed relation to the synchronizing impulses arising from the synchronizing element and is approximately cyclic and rectilinear. In the applicable instance of conventional television apparatus, synchronizing impulses trigger-off each scanning line and each field of a cyclically repeated raster, having relatively uniform periods and rectilinearity of trace.

In this instance the actuating pulses are, of course, the television signal arising from the operation of the transducing means 134 of Fig. 4, and the timing impulses are the synchronizing impulses arising from the operation of the synchronizing means 135. In the general application of our invention, mentioned in a preceding paragraph, a rigid regimen is not mandatory, particularly as to rectilinearity of the scanning operation, as long as the phase (time interval) between successive actuating pulses and timing impulses remains the same for the same input conditions.

Television amplifier 136 has plural stages of amplification 137, 138 and raises the energy level of the signal from the transducer. Synchronizing and/or blanking impulses from instrumentality 135, constituting precise and extended time indices, are combined with the television-like signal in certain of the plural stages of amplifier 137 in opposite polarity to the signal therein. This introduces the impulses 5 of waveform 2, Fig. 1.

The phases of pulses 3, 4 vary with respect to that of impulses 5 of waveform 2 or vice versa, depending upon the relative motion of the optical axis of the camera lens 131 with respect to the field of view and also depending upon motion of objects within that field. Motion of the optical axis may be caused, of course, by motion of a vehicle containing the camera or by the usual panning and tilting thereof in usual television practice.

In the embodiment herein detailed the precise time index is also impressed at terminal 29 of Fig. 1 from terminal 29 of Fig. 4 and the extended time index at terminal 78 of Fig. 2 from terminal 78 of Fig. 4.

The output of the equipment of Fig. 1 is thus dependent upon the phase between pulses 3, 4, etc. of waveform 2 and those impressed at point 29. Similarly, the output of the equipment of Fig. 2 is dependent upon the phase between pulses 3, 4, etc. of waveform 2 and those impressed at point 78.

In addition, the phase of pulses that may be impressed at point 64 or at the grid of vacuum tube 68 of Fig. 1, can be compared with that of pulses 3, 4 and/or those impressed at point 29. Also, the phase of pulses that may be impressed at point 106 or at the grid of vacuum tube 110 can be compared with that of pulses 3, 4 and/or those impressed at point 78.

The right hand section of double triode vacuum tube 6 comprises essentially an amplifier to raise the level of the impressed signals sufficiently for proper limiting and to isolate subsequent functions from possible variable conditions of connection to preceding equipment, of which that of Fig. 4 is one example.

The left hand triode 6 receives a large signal of positive polarity from the right hand triode. This causes grid current, which charges capacitor 7 to beyond cutoff. Because of the multimegohm value of resistor 8, this charge persists as long as signals of comparable amplitude continue. Consequently, "noise" and signals having an amplitude less than a certain value are eliminated. In a typical embodiment this action starts with an input signal amplitude of a half volt. At one volt the discrimination is two to one, while with a four volt signal other signals of three and one-half volts or less are eliminated. This action occurs when relay 9 is in the left hand position.

When relay 9 is moved to the right hand position, as upon receiving an electrical impulse from external means (not shown), resistor 8 is shorted and the limiting action of the vacuum tube is greatly reduced. Action on the chosen signal to the exclusion of others in the field of view occurs because of the recovery characteristic of the multivibrator next to be described.

After considerable investigation we have found that the accuracy of our device is enhanced by the inclusion of a multivibrator element to provide a signal pulse of invariable amplitude, shape and duration rather than to attempt to shape the actual signal pulse.

A one-shot multivibrator is comprised of the vacuum tube 10 and the directly adjacent resistor and capacitor elements. It is prevented from self-oscillation by a bias of cut-off value on cathode 11. This triode section rests at cut-off while the right hand section rests at saturation. A signal reaches the right hand section of the multivibrator as a negative pulse, which drives this section from saturation to cut-off. The positive pulse resulting in the plate circuit passes through the coupling capacitor 12, overcomes the resting bias and causes the tube to conduct. The multivibrator feedback capacitor 13 causes the usual regenerative action, to the end that a sharp downward change of amplitude results in the waveform 14.

The charge on the feedback capacitor 13 discharges slowly through grid leak 15. The left hand triode section consequently returns toward cut-off and when this point is reached the resulting impulse of the left hand anode reaching its maximum positive value passes through the feedback condenser 13 and returns the right hand section to saturation.

We found that reliable functioning of the multivibrator circuit is obtained when a multivibrator reset accelerator diode 16 is connected with cathode to the grid of the left hand triode section and anode to ground. This allows a short reset time interval because coupling condenser 12 is charged through the relatively low value of the diode resistance and a correspondingly long interval during which other signal pulses will not fire the multivibrator.

In this manner we achieve one of the objects of this invention. The short interval during which the multivibrator is reset occurs just prior to the time when the next bit of information on the chosen signal is nominally received, particularly if the signal originates because of a scanning process, such as in the television application supra. In this instance, this non-sensitive behavior, except during the brief cyclic interval mentioned, makes it possible for the subject equipment to maintain control on a chosen signal in spite of numerous other signals also present, many of which might have several times the strength of the chosen signal.

Continuing now to the next vacuum tube, the pulse shaper 17, capacitor 18 and resistor 19 have a short time constant which differentiates the rapid changer of amplitude of waveform 14. Because of a positive bias on the grid and series grid resistor 22 of the left hand section of tube 17, produced by application of plate supply potential through the voltage divider formed by resistors 19 and 20 this triode is saturated and all variations in the waveform are removed, save the large differented negative change of amplitude 21 which is produced by the firing of the multivibrator. This negative change of amplitude is shaped into a rectangular pulse 23 of fixed amplitude because of cut-off. It appears at the plate of this triode as an amplified pulse of positive polarity and is known as the discharge pulse 24.

This pulse is, in turn, differentiated by capacitor 25 and resistor 26. The circuit associated with the right hand triode of tube 17 is the same as with the left hand triode, thus another positive pulse 27 appears at the plate of this triode. Since the second change of amplitude of the discharge pulse comes through the stage this pulse occurs directly after the discharge pulse and is known as the charge pulse 27.

In order that a D. C. output proportional to the position of the signal pulse in time be obtained auxiliary waveforms are required. In the subject embodiment outputs with respect to a precise time index and with respect to an extended time index are provided. In coaction with the apparatus of Fig. 4 the precise time index corresponds to the period required for scanning one line across the field of view and has heretofore been identified as an azimuth function, while the extended time index corresponds to a scanning of the complete field of view and has been identified as an elevation function.

We turn now to the azimuth timing generator circuit, which is associated with double triode vacuum tube 28. A square wave voltage 29 in synchronism with the azimuth scan of, and supplied by, the camera synchronizing units of the equipment of Fig. 4, is impressed upon the cathode of the left hand triode of vacuum tube 28. This tube operates between cut-off and saturation, thereby removing small voltage irregularities, if any, in the incoming waveform.

Resistor 30 and capacitors 31 and 32 form an integrating circuit for converting the square wave into a triangular wave 33. Resistor 34 and capacitor 35 form a parabolic correction circuit to improve the linearity of the triangular wave. Resistor 36 feeds back a small amount of the triangular wave output which appears at the cathode 37 of triode section 38. This has the desirable effect of further increasing the linearity of the output and particularly of causing the triangular wave to be symmetrical about vertical axes through the peaks of the waveshape, a matter of importance in this equipment.

On grid 39 of triode section 40, the azimuth mixer tube, the charging pulse 27 and the triangular wave 33 are combined. This produces the waveform 41. The grid bias is fixed from a source 42 to place the triangular wave always beyond cutoff. The pulse 27 is fed in at an amplitude greater than that of the triangular waveform; conveniently, one-third greater.

The output from the azimuth mixer is taken from the cathode 43, over resistor 44. The amplitude thereof is a measure of the placement of the signal pulse in time with respect to the precise index of the triangular wave. In conjunction with the apparatus of Fig. 4 the amplitude is proportional to the position of the signal-producing object in the field of view horizontally. If the object is at the left side of the field of view, for instance, the combined amplitude of the triangular wave and the charging pulse is small and minimum output results. If the object is at the center of the field the combined amplitude is average. If the object is at the right side of the field the combined amplitude is large and the output is a maximum. Waveform 41 and those succeeding are for the center of the field of view condition.

The output pulse 45 described above charges a "key" capacitor 46 through the azimuth charging diode 47. The grid of the azimuth output amplifier 48 is directly connected to capacitor 46, consequently the direct current passed by this tube is directly determined by the charge of the capacitor. The tube is biased from negative source 42 so that plate current will flow when the potential of the cathode is below ground. This is desirable when fluctuations of cathode potential above and below ground are required. The cathode resistor of tube 48 is large enough that the cathode "follows" (i. e. remains more positive than) the grid potential and so grid current does not flow. Capacitor 46 was charged through diode 47, thus the charge cannot leak off through the azimuth mixer 40. We find that, using practical components, the charge remains on the key capacitor for many seconds. This is usually several times what is required. With perfect circuit elements the charge would, of course, remain indefinitely.

This functioning of our apparatus has important practical value. Certain exigencies of operation, in which the instantaneous position of the vehicle with respect to the desired object in the field of view is such that the object falls between scanning lines or in which a momentary apparatus defect or power surge occurs, may cause one or several of the incoming information pulses which actuate the multivibrator to be absent. In view of the above it is seen that the output of our apparatus will remain substantially according to the last information received, thus the vehicle is most intelligently directed until new information is again received.

In order that this equipment supply an output which is representative of the information supplied to it and that this output be independent of the prior charge on the key capacitor it is necessary that this capacitor be discharged to a greater extent than the most rapid downward rate of change of the amplitude of the azimuth mixer output pulse 45. Azimuth discharger triode 49 is provided for this purpose, the plate of the same being connected directly to the key capacitor and the grid of the same biased slightly beyond cutoff from source 42.

However, the grid does receive the discharge pulse 24 from the first triode section of the pulse shaper vacuum tube 17 described above. The plate of triode 49 is connected to the key capacitor, thus the latter is discharged by the action of the discharge pulse. Since the charge pulse 27 immediately follows the discharge pulse the potential of the key capacitor assumes a new value determined by the new information supplied to the equipment. This potential is again held until the next cycle of discharge and charge pulses occurs and so on.

The azimuth D. C. output of the equipment appears at the cathode 50 of triode 48 and is available for the control or operation of succeeding apparatus, of which servo-motors constitutes one example. In connection with the two similar operations previously mentioned the D. C. output is the difference in phase between the two and constitutes a correction signal.

It will be seen that the above described method and means provide an essentially pure direct current and voltage output from essentially short pulse input information. Since a low pass or equivalent filter is not employed there is no time-constant or delay in the output following the changes in input information. This is of great value and is a technologic achievement of wide application. With the present embodiment in relation to our previous attempts employing a low pass filter we have reduced the response time to the order of one one-thousandth of the old filter method. At the same time we have gained greatly from the energy standpoint. If the energy inherent in the incoming pulse information be amplified and filtered to a direct current it is found that the excessive pulse amplitudes cannot be accommodated in practical apparatus and that considerable D. C. amplification is required after conversion of the inherent pulse energy into direct current energy. The undesirability of this complication as well as the traditional instabilities of this amplification are well known.

In the above manner we accomplish several objects of our invention.

Another fundamental need is filled when rate of change of information supplied to this equipment can be delivered electronically without time lag and in the convenient form of a varying direct current. This is accomplished by further instrumentalities identified by the word rate.

The grid of triode 51, the azimuth rate mixer, receives a charging pulse 54 from the cathode 43 of triode 40. This represents the latest azimuth pulse information.

From cathode 50 the D. C. azimuth output is conveyed to capacitor 52 which is in the cathode circuit of azimuth rate mixer 51. This represents the immediately prior azimuth information. The time constant of this capacitor and resistor 53 is somewhat less than the interval between pulses of information, to the end that the potential of capacitor 52 is certain to reach the full value of that at cathode 50. It is important, on the other hand, that this time constant not be only a small fraction of this interval because then we have found that the pulse waveshapes depart from desired rectangularity.

Tube 51 operates at cut-off; thus there is no current drain from capacitor 52 until the azimuth pulse 54 occurs. It is seen that the amplitude of the pulse 55 in the plate circuit of tube 51 is proportional to the amplitude of the pulse on the grid (the new information) and to the potential of the cathode (the old information). If the new information has a greater amplitude than the old the plate circuit pulse will rise from a median value, if the new information has a lesser amplitude than the old the plate circuit pulse will fall from the median value. Thus, the amplitude of pulse 55 relative to its median value is proportional to the rate of change of information supplied to this equipment.

In combination with the apparatus of Fig. 4 the median value represents no motion of the object in the field of view, a motion to the left being shown by a decrease of amplitude of pulse 55 relative to the median value and a motion to the right by an increase. If the motion is slow the change from the median value is small; if fast, large.

Although pulse 55 exhibits rate information it is desirable that this information be supplied in the form of a direct current of periodically adjusted amplitude. This is accomplished by a key capacitor means the same as employed for the azimuth output previously described.

In the present instance, triode section 56 constitutes an amplifier which inverts the phase of pulse 55 to positive pulse 57 and increases the amplitude thereof. Triode section 58 acts as a cathode output amplifier for charging the rate key capacitor 59 through charging diode 60. Key capacitor 59 is discharged by the same discharge pulse 24 previously described. This acts through the azimuth rate discharger triode 61.

The grid of the azimuth rate output amplifier 62 is directly connected to the rate key capacitor 59 and the D. C. output appears at the cathode 63. In this manner we accomplish other objects of this invention.

Particularly in connection with a collision course it is necessary to secure the derivative of both the displacement information in the field of view of the equipment and of the displacement of the vehicle containing the equipment with respect to a fixed line in space. We have found it best to differentiate the two items of information and add the differentials rather than to combine the information and take the derivative. With our method a minimum of apparatus is used and a maximum flexibility as to individual outputs is secured.

In Fig. 1, the movable arm of potentiometer 64 is attached to a directional gyroscope. The potentiometer is also connected across a source of voltage, conveniently through a series resistor 65. The variations of potential which are thereby produced are relatively slow, of the order of a second rather than a thousandth of a second as usually encountered in electronic work. Capacitor 66 and resistor 67 have a small time constant, of the order of a hundredth of a second and effectively differentiate the slow gyroscope-produced variations.

Triode sections 68 and 69 comprise a two stage amplifier capable of reproducing low frequencies by means of large time constants in the coupling components. The output from triode 69 is fed into the grid of triode 51, the azimuth rate mixer, being isolated from the normal pulse by a resistor 70 of several megohms value. The potential thus added in is proportional to the differential of the gyro output and either adds to or subtracts from the grid-cathode potential established by the new azimuth pulse on the grid and the old integrated pulse on the cathode. Thus the two rates are combined in the one triode and the output at cathode 63 of the azimuth rate output amplifier contains the combined information.

In this embodiment should a rate gyro rather than the directional gyro be available the rate gyro is conveniently connected to the grid of triode 69; the differentiating components 66 and 67 not being used.

In this manner we achieve further objects of our invention.

When the initial data is derived from a television-like field of view, often elevation control information is also required and in other applications an output with respect to an extended time index is desirable. This portion of our equipment is shown in Fig. 2.

Fortunately, the signal limiting, waveshaping, charging and discharging means established for the azimuth function are used without modification to secure the elevation function. Consequently, the charge pulse 27 is conveyed via terminals 71 from Fig. 1 to Fig. 2 and thence to the grid of triode section 73, the elevation mixer. Resistors 74 and 75 provide necessary isolation from other portions of the circuit.

The elevation timing generator, double triode 76, produces the extended time index waveform 77. A pulse waveform 78 in synchronism with the elevation scan of, and supplied by, the camera synchronizing units of the equipment shown in Fig. 4, is impressed upon the cathode of the left hand triode of vacuum tube 76 and also in reduced amplitude to the grid of the right hand section of the same tube.

The left hand triode of 76 works between saturation and cut-off, thereby removing small voltage irregularities, if any, in the incoming waveform. Capacitors 79 and 80, attached to the plate of the left hand triode, charge through the plate resistor 81, of large value, and are discharged quickly through the left hand triode section of tube 76 upon the arrival of the pulse of waveform 78. Resistor 82 and capacitor 83 form a parabolic correction circuit to improve the linearity of the sawtooth waveform.

The right hand triode section of vacuum tube 76 acts as an isolating and waveform shaping amplifier. We have found that waveform 77 should contain a peak at the start of the linear decline so that by the time it reaches the elevation mixer grid through isolating resistor 84 a decline linear throughout its entire length is secured as shown in waveform 85. Capacitor 86 and resistor 87 feed a somewhat differentiated form of the original pulse 78 to the second grid to produce the peak in waveform 77.

At the grid of the elevation mixer, triode 73, the signal pulse and the elevation timing generator sawtooth wave are combined to produce the waveshape 85. The grid bias is fixed from source 42 to place the sawtooth wave always beyond cut-off. As in the azimuth mixer, triode 40, the position of the signal pulse with respect to the sloping wave time index determines the amplitude of the pulse output. In conjunction with the apparatus of Fig. 4 this amplitude is proportional to the position of the signal producing object in the field of view vertically. The output is taken from cathode 88 of triode 73, and through elevation charging diode 89 charges the elevation "key" capacitor 90.

The grid of the elevation output amplifier 91 is directly connected to capacitor 90, consequently the direct current passed by this tube is directly determined by the charge of the capacitor. The tube is biased from negative source 42 so that plate current will flow when the potential of the cathode is below ground. This is desirable when fluctuations of cathode potential above and below ground are required. The cathode resistor of tube 48 is large enough that the cathode "follows" (i. e. remains more positive than) the grid potential and so grid current does not flow. Since capacitor 90 was charged through diode 89, its charge cannot leak off through elevation mixer 73. Consequently, the charge remains unaltered until the discharge pulse occurs.

The discharge pulse comes via terminals 72 from Fig. 1 to Fig. 2. Elevation discharger triode 92 amplifies and isolates the pulse from its source in Fig. 1, the plate electrode of triode 92 being connected directly to the key capacitor 90 and the grid being biased slightly beyond cutoff from source 42. When the discharge pulse occurs its positive polarity causes triode 92 to conduct and discharge capacitor 90.

The charge pulse 27 immediately follows the discharge pulse and the key capacitor consequently assumes a new potential determined by the new information supplied to the equipment. This potential is again held until the next cycle of discharge and charge pulses occurs, and so on.

The elevation D. C. output of the equipment appears at the cathode 93 of triode 91 and is available for the control or operation of succeeding apparatus, of which servo-motors constitutes one example. The way in which these devices accomplish steering of a vehicle is well known in the art.

Again, as with the azimuth rate function, elevation rate information is supplied.

The grid of triode 94, the elevation rate mixer, receives a charging pulse 95 from the cathode 88 of triode 73. This represents the latest elevation pulse information.

From cathode 93 the D. C. elevation output is conveyed to capacitor 96 which is in the cathode circuit of mixer 94. This represents the immediately prior elevation information. The time constant of capacitor 96 and resistor 97 is somewhat less than the interval between pulses of information, to the end that the potential of capacitor 96 is certain to reach the full value of that of the cathode 93, as was previously described in explaining the azimuth rate portion of the equipment.

Tube 94 operates at cut-off, thus there is no current drain from capacitor 96 until the elevation pulse 95 occurs. It is seen that the amplitude of the pulse 113 in the plate circuit of tube 94 is proportional to the amplitude of the pulse on the grid (the new information) and to the potential of the cathode (the old information). The amplitude of pulse 113 relative to its median value is thus proportional to the rate of change of information supplied to this equipment.

In combination with the previously mentioned apparatus of Fig. 4 the median value represents no motion of the object in the field of view, a motion downward being represented by a decrease of amplitude of pulse 113 relative to the median value and a motion upward by an increase. If the motion is slow the change from the median value is small; if fast, large.

As in the azimuth rate portion of the equipment the amplitude of 113 is converted to a direct current output of periodically adjusted amplitude. Triode 98 inverts the phase of pulse 113 to the positive pulse 99 and increases the amplitude thereof. Triode 100 acts as a cathode output amplifier for charging the elevation rate key capacitor 101 through diode 102. Key capacitor 101 is discharged by the previously described discharge pulse 24 which acts through the elevation rate discharger triode 103.

The grid of the elevation rate output amplifier 104 is directly connected to the elevation rate key capacitor 101 and the D. C. output appears at the cathode 105. In this manner we accomplish another object of this invention.

As in the azimuth rate function we combine the elevation rate information with gyroscopic information to supply the derivative of displacement information of the vehicle containing the equipment with respect to a fixed line in space.

In Fig. 2, the movable arm of potentiometer 106 is attached to a gyroscope giving displacement information as to elevation of the gyro with respect to a horizontal plane. The potentiometer is connected across a source of voltage, conveniently through a series resistor 107. As before, the variations of potential thereby produced are slow, and capacitor 108 and resistor 109 differentiate the gyroscope-produced variations. Triode sections 110 and 111 comprise a two stage amplifier capable of reproducing low frequencies.

The output from triode 111 is fed into the grid of triode 94, the elevation rate mixer, being isolated from the normal pulse by a resistor 112 of several megohms value. The potential thus impressed either adds to or subtracts from the grid-cathode potential established by the normal rate functioning. The two rates are thus combined and the output at cathode 105 of the elevation rate output amplifier contains the combined information.

Should a rate gyro rather than the displacement gyro be available the former is conveniently connected to the grid of triode 111, the differentiating components 108 and 109 not being required.

In the above manner we accomplish substantially all the objects of our invention. Among other things we provide a substantially pure D. C. output at negligible time constant delay. This is suitable for operating servomotors, relays, recording meters and many other devices. It is conceivable that in some applications the slight "cut" in the output waveform caused by the discharge pulse would be objectionable. If so, this can be removed by the additional circuit of Fig. 3.

In Fig. 3 the previously described discharge pulse 24 is impressed on terminal 114, as by connecting this terminal to terminal 72 of Fig. 1. At terminal 117 the azimuth output from cathode 50 of the azimuth output amplifier 48 of Fig. 1 is connected. Capacitor 115 of Fig. 3 removes the D. C. plate voltage from the discharge pulse circuit and resistor 116 attenuates the pulse a matter of several times. Resistor 118 acts as voltage divider coacting with resistor 116 and also as an isolating resistor with respect to cathode 50.

The grid of vacuum tube 119 thus has impressed upon it a convenient amplitude of pulse 24 and a bias varying according to the D. C. value of the output from cathode 50. These are represented in the waveform adjacent to the grid as 24' and 50', in which line 120 represents the cutoff level of the grid characteristic. The amplitude of that portion of pulse 24' which overcomes the cutoff level will appear in the cathode 121—plate 122 circuit of tube 119. This amplitude will depend upon the bias 50' which varies according to the azimuth output. Since the depth of the original cut varies with the output, compensation is achieved.

Resistors 123 and 124 place a fixed positive bias on the cathode by virtue of being connected to a source of positive voltage. Through capacitor 125 and terminal 126 the output of tube 119 is reconveyed to cathode 50 so that the compensation is applied to the output. Cathode resistor 123 has a value relatively large with respect to the cathode output impedance of the azimuth output amplifier (Fig. 1). Tube 119 (Fig. 3) is biased beyond cutoff at all times except when the compensatory pulse 24' occurs. Thus the azimuth amplifier output is not affected as to impedance or amplitude.

Fig. 3 gives means for treating but one output. Should the four available outputs of Figs. 1 and 2 require treatment the means of Fig. 3 are merely duplicated four times and applied in an analogous manner according to the teaching of this specification.

Having thus fully described our invention, we claim:

1. Apparatus for electronic control in which the location of an object in the field of view is represented in pulse form, the amplitude of one pulse corresponding to the distance from the center of the field in azimuth, the amplitude of another pulse corresponding to the distance from the center of the field of view in elevation, comprising; means for producing a discharge pulse just before each said pulse of a larger fixed amplitude and of opposite polarity to said pulse, means for discharging a capacitor by said discharge pulse and charging said capacitor with said one pulse through a rectifier, means for impressing the potential of said capacitor upon the control electrode of a vacuum tube in the plate circuit of which a current flows proportional to said potential, means for discharging another capacitor by said discharge pulse and charging said other capacitor with said other pulse through a rectifier, and means for impressing the potential of said condenser upon the control electrode of another vacuum tube in the plate circuit of which a current flows proportional to said potential.

2. Apparatus for electronic control in which information as to the location of an object within a field of view is represented by the amplitude of one series of pulses which correspond to the distance from a fixed point in the field of view in azimuth, the amplitude of another series of pulses which correspond to the distance from a fixed point in the field of view in elevation comprising; means for producing information as to the rate of change of the amplitude of the pulses in each of said series, means for producing a discharge pulse just before each pulse in each of said series of larger amplitude and of opposite polarity to said pulses, means for discharging a capacitor by said discharge pulses and immediately thereafter charging said capacitor with pulses of the first said series through a rectifier, means for impressing the potential of said capacitor upon the control electrode of a vacuum tube in the plate circuit of which a current flows proportional to said potential, means for discharging another capacitor with said discharge pulses, and immediately thereafter charging said capacitor with pulses of the second said series through a rectifier, and means for impressing the potential of said capacitor upon the control electrode of another vacuum tube in the plate circuit of which a current flows proportional to said potential.

3. An electronic control apparatus in which information is supplied in repetitive pulse form and transformed to a substantially constant electrical energy output, comprising; means to form two successive pulses from each of said repetitive pulses, a capacitor, means to hold the first of said successive pulses at constant energy content, means to discharge said capacitor by said first pulse, means to charge said capacitor by the second of said successive pulses, a source of electrical energy, means to regulate said source according to the charge on said capacitor, means to reverse the phase of said first pulse, means to adjust the amplitude of said first pulse according to the amplitude of said second pulse and means to apply said reversed first pulse to said electrical source.

4. In electronic control apparatus in which information is supplied as the time interval between an actuating pulse and a timing impulse, means adapted to form two pulses from said actuating pulse, means to form a waveform which varies in amplitude substantially uniformly with time, means to form a third pulse of amplitude proportional to the time relation between the latter of the said two pulses and said waveform, a capacitor, means for charging said capacitor in proportion to the amplitude of said third pulse, and means for discharging said capacitor by the former of the said two pulses.

5. An electronic control apparatus comprising; differentiating means adapted to form two pulses from a single actuating pulse, shaping means to give a substantially rectangular shape to said pulses, means to produce a timing impulse coactively related to the time of occurrence of said actuating pulse, waveshaping means to form a sloping waveshape with respect to time from said timing impulse, a vacuum tube having input and output electrodes, means to combine the later in time of the two said pulses and said sloping waveshape upon an input electrode of said vacuum tube, means to produce a bias on said input electrode greater than the amplitude of said sloping waveshape, a diode having a cathode and anode, a capacitor, said capacitor connected to the cathode of said diode, the output electrode of said vacuum tube connected to the anode of said diode, a second vacuum tube having a control electrode and an electrode adapted to pass current when a pulse is impressed upon said control electrode, means for impressing the earlier in time of the two said pulses upon the control electrode of said second vacuum tube, the electrode adapted to pass current through said second vacuum tube connected to said capacitor.

6. In electronic control apparatus in which information is supplied in repetitive pulse form, a vacuum tube having electrodes, means for causing said pulses to produce a high bias on the input electrode of said tube, a one shot multivibrator connected to the output electrode of said tube, said system adapted to operate on the repetitive pulse of maximum amplitude, additional means for removing said high bias means at will, said system then adapted to operate on the repetitive pulse which was operating the system at the instant said additional means was actuated and not on other pulses.

7. An electronic control apparatus, in which information is supplied as the time interval between an actuating pulse and a timing impulse, comprising; means adapted to select the actuating pulse of maximum amplitude from a plurality of actuating pulses, a one-shot multivibrator adapted to synchronize and produce a pulse only upon said maximum pulse, differentiating means to produce two pulses from the pulse produced by said multivibrator, rectangular pulse shaping means connected thereto, waveshaping means to form a timing waveshape varying in amplitude with time, from said timing impulse, combining means adapted to produce an output pulse proportional to the combined amplitude of the later in time of the two said pulses and said timing waveshape, a capacitor, means to apply the earlier in time of the two said pulses to said capacitor for the discharge thereof, means to apply said output pulse for the charge thereof, a source of electrical energy, means to regulate the output of said source according to the charge on said capacitor.

8. An electronic control apparatus to which information is supplied in repetitive pulse form, comprising; an azimuth capacitor, means to discharge said capacitor, means to charge said capacitor proportionally according to the azimuth component of said information, an elevation capacitor, means to discharge said capacitor, means to charge said capacitor proportionally according to the elevation component of said information, means to compare the next value of azimuth information with the prior value of azimuth information retained as the charge on said azimuth capacitor, an azimuth rate capacitor, means to discharge said capacitor, means to charge said capacitor according to the difference between said next and said prior values of azimuth information, means to compare the next value of elevation information with the prior value of elevation information retained as the charge on said elevation capacitor, an elevation rate capacitor, means to discharge said capacitor, and means to charge said capacitor according to the difference between said next and said prior values of elevation information.

9. An electronic control apparatus to which information is supplied in repetitive pulse form and in the form of a variable value of electricity, comprising; an azimuth capacitor, means to discharge said capacitor, means to charge said capacitor according to the azimuth component of said pulse information, an elevation capacitor, means to discharge said capacitor, means to charge said capacitor according to the elevation component of said pulse information, means to compare the next value of azimuth pulse information with the prior value of azimuth pulse information retained as the charge on said azimuth capacitor, an azimuth rate capacitor, means to discharge said capacitor, means to charge said capacitor according to the difference between said next and said prior values of azimuth pulse information, means to compare the next value of elevation pulse information with the prior value of elevation pulse information retained as the charge on said elevation capacitor, an elevation rate capacitor, means to charge said capacitor according to the difference between said next and said prior values of elevation pulse information, means to differentiate the azimuth component of said variable value of electricity representing said variable value of information, means to combine said differentiated value with said charge on said azimuth rate capacitor, means to differentiate the elevation component of said variable value of electricity representing said variable value of information, and means to combine said differentiated value with said charge on said elevation rate capacitor.

10. An electronic control apparatus in which the location of an object in the field of view is represented by the time interval between an object-produced pulse and a timing impulse in synchronism with azimuth scanning and by the time interval between said object-produced pulse and a timing impulse in synchronism with elevation scanning, comprising; means adapted to select the object-produced pulse of maximum amplitude from a plurality of said pulses, a one-shot multivibrator, means to synchronize said multivibrator by said object-produced pulse of maximum amplitude, differentiating means coactively connected to said multivibrator to form two pulses from the output thereof, pulse shaping means connected to said differentiating means; integrating means adapted to modify said azimuth timing impulse to a waveshape which varies substantially uniformly as a function of time, a vacuum tube having input and output electrodes, means to impress upon said input electrode said uniform waveshape and the later in time of the two said differentiation-formed pulses, means to produce a bias on said input electrode greater than the amplitude of said uniform waveshape, a diode having a cathode and an anode, a capacitor, said capacitor connected to the cathode of said diode, the output electrode of said vacuum tube connected to the anode of said diode, a second vacuum tube having a control electrode and an electrode adapted to pass current when a pulse is impressed upon said control electrode, means for impressing the earlier in time of the two said differentiation-formed pulses upon the control electrode of said second vacuum tube, the electrode adapted to pass current through said second vacuum tube connected to said capacitor; a second integrating means adapted to modify said elevation timing impulse to a second waveshape which varies substantially uniformly as another function of time, a third vacuum tube having input and output electrodes, means to impress upon said input electrode said uniform waveshape and the later in time of the two said differentiation-formed pulses, means to produce a bias on said input electrode greater than the amplitude of said second uniform waveshape, a second diode having a cathode and an anode, a second capacitor, said second capacitor connected to the cathode of said second diode, the output electrode of said third vacuum tube connected to the anode of said second diode, a fourth vacuum tube having a control electrode and an electrode adapted to pass current when a pulse is impressed upon said control electrode, means for impressing the earlier in time of the two said differentiation-formed pulses upon the control electrode of said fourth vacuum tube, the electrode of said fourth vacuum tube adapted to pass current connected to said second capacitor.

11. In electronic control apparatus in which information is supplied as the time interval between an actuating pulse of electrical energy and a timing impulse of electrical energy, means adapted to fire an externally-excited oscillator from said actuating pulse giving an electrical energy pulse output, waveshaping means for producing electrical energy having substantially uniform variation of amplitude with time from said timing impulse, means for combining the pulse output of said oscillator with said energy having uniform variation with time, and means for forming an output of electrical energy of amplitude proportional to the amplitude of that said energy having uniform variation with time corresponding to the time of occurrence of said actuating pulse.

12. In electronic control apparatus in which information is supplied as the time interval between an actuating pulse of electrical energy and a timing impulse of electrical energy, waveshaping means to reform the electrical energy of said timing impulse to energy having substantially uniform variation of amplitude with time, an electrical pulse oscillator fired by said actuating pulse, means to combine said reformed energy and the oscillator pulse resulting from said firing, and means for controlling the amplitude of other electrical energy in proportion to the combined amplitude of said reformed energy and said oscillator pulse.

13. In electronic control apparatus in which information is supplied as the time interval between an actuating pulse of electrical energy and a timing impulse of electrical energy, means for forming from the energy of said timing impulse energy which varies in amplitude substantially uniformly with time, means to form an entity of electrical energy having an amplitude proportional to the time relation between the actuating pulse and that energy which varies in amplitude substantially uniformly with time, a capacitor, and means for charging said capacitor in proportion to the amplitude of said entity.

14. In electronic control apparatus in which information is supplied in the form of recurrent pulses of electrical energy having various amplitudes, an electronic device having input and output circuits, means to apply said pulses to said input circuit, means to prevent any of said pulses having less than a predetermined amplitude from passing through said electronic device, an externally-excited oscillator having a time constant connected to the output circuit of said device, said oscillator being actuated by such said pulses as pass through said electronic device; further means for causing said preventative means to become inoperative during operation of the device as a whole, said oscillator then being operative upon recurrences of the pulse upon which it was operating at the instant said further means were actuated, and not upon other pulses.

HARRY R. LUBCKE.
JOSEPH P. DEAN.

REFERENCES CITED

The following references are of record in the file of this patent:

UNITED STATES PATENTS

| Number | Name | Date |
|---|---|---|
| 2,294,863 | Hadfield | Sept. 1, 1942 |
| 2,329,570 | Wellenstein et al. | Sept 14, 1943 |
| 2,335,265 | Dodington | Nov. 30, 1943 |
| 2,403,975 | Graham | July 16, 1946 |
| 2,416,328 | Labin | Feb. 25, 1947 |
| 2,419,340 | Easton | Apr. 22, 1947 |
| 2,419,569 | Labin et al. | Apr. 29, 1947 |
| 2,434,894 | Ambrose | Jan. 27, 1948 |
| 2,451,632 | Oliver | Oct. 19, 1948 |
| 2,466,705 | Hoeppiner | Apr. 12, 1949 |